United States Patent
Tolle et al.

(10) Patent No.: US 7,597,236 B2
(45) Date of Patent: Oct. 6, 2009

(54) METHOD FOR FORMING MATERIALS

(75) Inventors: Charles R. Tolle, Idaho Falls, ID (US); Denis E. Clark, Idaho Falls, ID (US); Herschel B. Smartt, Idaho Falls, ID (US); Karen S. Miller, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 579 days.

(21) Appl. No.: 11/205,616

(22) Filed: Aug. 16, 2005

(65) Prior Publication Data
US 2007/0040006 A1 Feb. 22, 2007

(51) Int. Cl.
B23K 20/12 (2006.01)
(52) U.S. Cl. .................... 228/112.1; 228/248.1
(58) Field of Classification Search ............ None
See application file for complete search history.

(56) References Cited

U.S. PATENT DOCUMENTS

| | | | |
|---|---|---|---|
| 4,636,124 A | 1/1987 | Gugle et al. | |
| 5,460,317 A | 10/1995 | Thomas et al. | |
| 5,769,306 A | 6/1998 | Colligan | |
| 5,971,247 A | 10/1999 | Gentry | |
| 5,971,252 A * | 10/1999 | Rosen et al. | 228/112.1 |
| 6,045,028 A * | 4/2000 | Martin et al. | 228/112.1 |
| 6,079,609 A | 6/2000 | Fochtman | |
| 6,173,880 B1 | 1/2001 | Ding et al. | |
| 6,230,957 B1 | 5/2001 | Arbegast et al. | |
| 6,237,835 B1 | 5/2001 | Litwinski et al. | |
| 6,259,052 B1 | 7/2001 | Ding et al. | |
| 6,484,924 B1 | 11/2002 | Forrest | |
| 6,543,670 B2 * | 4/2003 | Mahoney | 228/112.1 |
| 6,543,671 B2 * | 4/2003 | Hatten et al. | 228/112.1 |
| 6,572,007 B1 * | 6/2003 | Stevenson et al. | 228/112.1 |
| 6,613,447 B2 | 9/2003 | Aota et al. | |
| 6,619,534 B2 | 9/2003 | Aota et al. | |
| 6,729,526 B2 | 5/2004 | Okamoto et al. | |
| 6,913,186 B2 * | 7/2005 | Vyas | 228/112.1 |
| 7,163,138 B1 * | 1/2007 | Dudt et al. | 228/112.1 |
| 2003/0042291 A1 * | 3/2003 | Mahoney | 228/112.1 |
| 2003/0042292 A1 * | 3/2003 | Hatten et al. | 228/112.1 |
| 2003/0075584 A1 * | 4/2003 | Sarik et al. | 228/2.1 |
| 2003/0192941 A1 * | 10/2003 | Ishida et al. | 228/112.1 |

(Continued)

FOREIGN PATENT DOCUMENTS

JP      2002035962 A  *  2/2002

(Continued)

*Primary Examiner*—Kiley Stoner
(74) *Attorney, Agent, or Firm*—TraskBritt (57) ABSTRACT

A material-forming tool and a method for forming a material are described including a shank portion; a shoulder portion that releasably engages the shank portion; a pin that releasably engages the shoulder portion, wherein the pin defines a passageway; and a source of a material coupled in material flowing relation relative to the pin and wherein the material-forming tool is utilized in methodology that includes providing a first material; providing a second material, and placing the second material into contact with the first material; and locally plastically deforming the first material with the material-forming tool so as mix the first material and second material together to form a resulting material having characteristics different from the respective first and second materials.

2 Claims, 9 Drawing Sheets

U.S. PATENT DOCUMENTS

| | | | |
|---|---|---|---|
| 2004/0195293 A1* | 10/2004 | Hamada et al. | 228/103 |
| 2004/0265503 A1* | 12/2004 | Clayton et al. | 427/446 |
| 2005/0045695 A1* | 3/2005 | Subramanian et al. | 228/112.1 |
| 2005/0051602 A1* | 3/2005 | Babb et al. | 228/112.1 |
| 2006/0032891 A1 | 2/2006 | Flak et al. | |
| 2006/0049234 A1* | 3/2006 | Flak et al. | 228/112.1 |
| 2006/0108394 A1* | 5/2006 | Okaniwa et al. | 228/101 |
| 2006/0191978 A1* | 8/2006 | Barnes | 228/112.1 |

FOREIGN PATENT DOCUMENTS

| | | | |
|---|---|---|---|
| JP | 2005019933 A | * | 1/2005 |
| JP | 2005081427 A | * | 3/2005 |

* cited by examiner

METHOD FOR FORMING MATERIALS

GOVERNMENT RIGHTS

The United States Government has certain rights in this invention pursuant to Contract No. DE-AC07-05ID14517 between the United States Department of Energy and Battelle Energy Alliance, LLC.

TECHNICAL FIELD

The present invention relates to a material-forming tool, and method for forming a material, and more specifically, to a friction stir welding tool, which has parts that are replaceable, and which is further useful in forming materials that may comprise alloys, composites or the like.

BACKGROUND OF THE INVENTION

The prior art is replete with numerous examples of friction stir welding devices that are useful in welding various materials. As a general matter, friction stir welding is a technique whereby a rotating tool is brought into forcible contact with an adjacent work piece to be welded, and the rotation of the tool creates frictional heating of the adjacent work piece, and extensive deformation as mixing occurs along a plastic zone. Upon cooling of the plastic zone the work pieces are joined along a welding joint. Examples of prior art friction stir welding devices and other methodologies are more fully disclosed in U.S. Pat. Nos. 4,636,124; 5,460,317; 5,769,306; 5,971,247; 6,079,609; 6,173,880; 6,230,957; 6,237,835; 6,259,052; 6,484,924; 6,613,447; 6,619,534; and 6,729,526, the teachings of which are incorporated by reference herein. It is generally agreed that friction stir welding allows for the autogenous welding of joints with no alloying effects caused by traditional melting operations, such as may be achieved by plasma welding, laser welding, tungsten inert gas welding, etc. As a general matter, friction stir welding typically preserves more of the cast micro-structural properties than other welding methods.

Researchers and designers have faced many challenges with respect to the creation of various new alloys and composite materials that may be used in various industrial and military applications. For example, many new materials are needed where the material needs to possess several different conflicting material properties. For example, extensive research has focused, as of late, on the production of lightweight composite armor, that is, armor that provides protection from large caliber rounds, but is lightweight so that it may be placed or deployed on mobile platforms. In lightweight armor, conflicting material properties present themselves, for example, the new armor must have a desirable microstructure for ballistic resistance and fatigue performance while simultaneously possessing characteristics of ease of forming and joining. The same armor must possess sound ballistic resistance on the outside-facing surface of same, and good structural properties on the inwardly facing surface, which are favorable for structural and ballistic designs.

Therefore, a material-forming tool and a method for forming a material that addresses these and other shortcomings in the prior art practices and techniques utilized heretofore is the subject matter of the present application.

SUMMARY OF THE INVENTION

A first aspect of the present invention relates to a method for forming a material that includes providing a first material; providing a second material, and placing the second material into contact with the first material; and locally plastically deforming the first material so as to mix the first material and second material together to form a resulting material having characteristics different from the respective first and second materials.

Another aspect of the present invention relates to a method for forming a material that includes providing a first metal; providing a second metal, and positioning the second metal in juxtaposed relation relative to the first metal; providing a tool and imparting axial force, and rotational movement to the tool; and contacting the tool with the first and second metals and imparting sufficient axial force and rotational movement to the tool so as to locally plastically deform and mix the first and second metals and form a resulting material having physical characteristics different from the respective first and second metals.

Still another aspect of the present invention relates to a material-forming tool that includes a shank portion; a shoulder portion that releasably engages the shank portion; a pin that releasably engages the shoulder portion, wherein the pin defines a passageway; and a source of a material coupled in material flowing relation relative to the pin.

These and other aspects of the present invention will be described in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
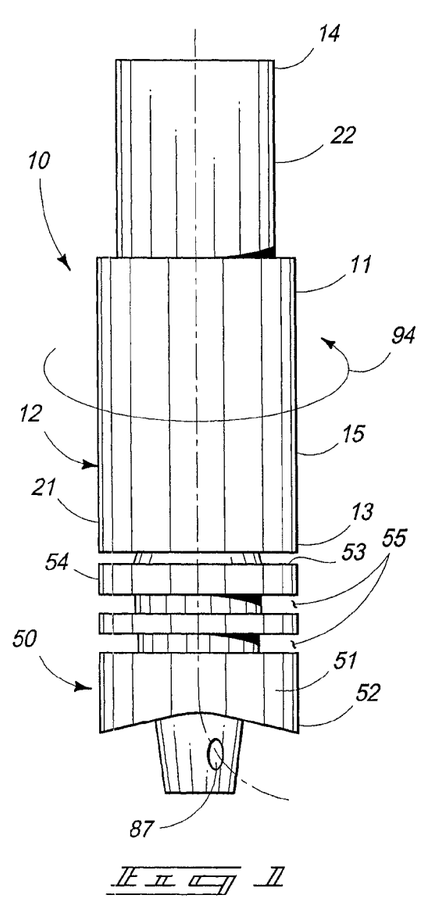
FIG. 1 is a greatly simplified, schematic, side elevation view of an assembled material-forming tool of the present invention.
Figure 2:
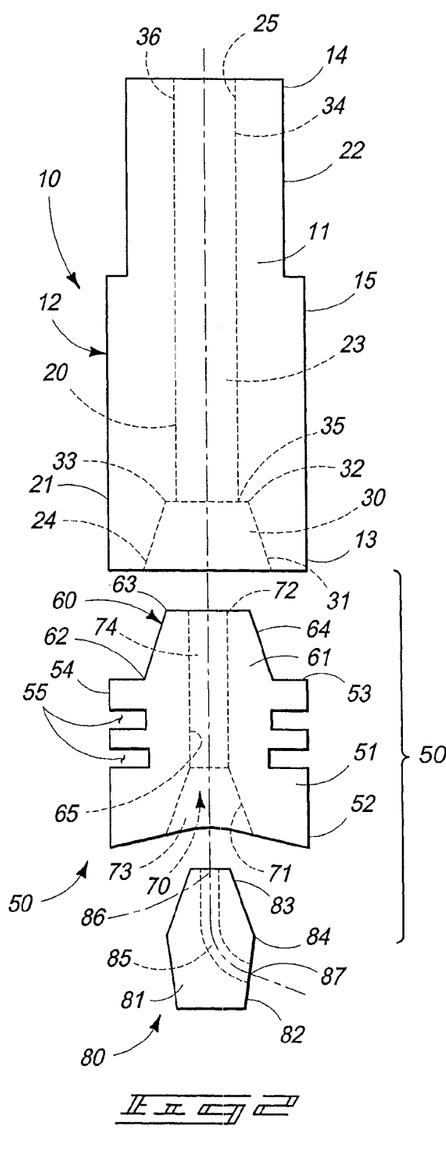
FIG. 2 is a greatly simplified, schematic, exploded, side elevation view of the material-forming tool of FIG. 1 and showing some underlying surfaces in hidden lines.

A material-forming tool of the present invention is generally indicated by the numeral 10 in FIG. 1 and subsequent drawings. Referring now to FIGS. 1 and 2, for example, the material-forming tool 10 of the present invention is illustrated and includes a shank portion 11. The shank portion 11 is defined by an elongated main body 12, which has a first end 13, and an opposite second end 14, which is forcibly engaged by a machine (not shown) and which imparts rotational movement to the shank portion 11 as indicated by the arrows as placed in the various drawings. The main body 12 is defined by an exterior-facing surface 15, and an opposite interior-facing surface 20 (FIG. 2). As seen in FIGS. 1 and 2, the shank portion and, more specifically, the exterior-facing surface 15, may be defined by a first outside diametral portion 21, and a second portion 22 has a second outside diametral dimension. As illustrated, the first outside diametral portion 21 is greater in cross sectional dimension than the second portion 22. As illustrated in FIG. 2, the first diametral portion 21, having the first outside diametral dimension, is positioned adjacent to the first end 13 of the main body, and the second portion 22 is positioned adjacent to the second end 14 thereof. It should be understood in other forms of the invention (not shown), the shank portion of the material-forming tool may be substantially uniform in its outside diametral dimension when measured between the first and second ends 13 and 14, respectively. As will be appreciated to one skilled in the art, the first diametral portion 21, and the second portion 22 may have various outside diametral dimensions depending upon the use of the material-forming tool 10, that is, the amount of pressure that the material-forming tool 10 might experience in operation, and the thermal coefficient of expansion of the various materials that might be utilized to fabricate the individual portions of the material-forming tool 10 as will be described in greater detail hereinafter.

Referring still to FIG. 2, the interior-facing surface 20 of the main body 12 as noted above, defines a longitudinally extending passageway 23 that extends from a first end 24 to a second end 25. The longitudinally extending passageway 23 has a first portion 30 that has a diminishing diametral dimension, when this dimension is measured from the first end 24 of the passageway 23 in the direction of the second end 25 thereof. As seen in FIG. 2, for example, this first portion 30 of the passageway is generally characterized by a taper such as a Jacob's Taper #1, or a pin taper #8. In the form of the invention as seen in FIGS. 1 and 2, it will be understood that the first portion 30 of the passageway 23 has a first end 31, which is adjacent to the first end 13 of the main body 12, and an opposite second end 32, which is defined by a circumscribing seat 33. Still further, the longitudinally extending passageway 23 has a second portion 34, which has a first end 35 and an opposite second end 36, which is positioned adjacent to the second end 14 of the main body 12.

As best understood by a study of FIG. 2, the material-forming tool 10 of the present invention includes a shoulder portion that is generally indicated by the numeral 50, and that is releasably engageable with the shank portion 11. As best illustrated, by a study of FIG. 2 and subsequent drawings, the shoulder portion has a main body 51, with opposite first and second ends 52 and 53, respectively. Still further, the main body has an exterior-facing surface 54 that has a plurality of circumscribing channels 55 formed therein. The circumscribing channels 55 act to control heat flow within the material-forming tool 10 during the material-forming process. It should be understood that the shoulder portion 50 may be cooled by a supplemental means in order to dissipate heat energy that is generated during the material-forming process as will be described hereinafter. As seen in FIG. 2 and subsequent drawings, the shoulder portion 50 includes a male member that is generally indicated by the numeral 60, and that is releasably matingly received within the first portion 30 of the longitudinally extending passageway 23 that is defined by the shank portion 11. The male member 60 has a main body 61 with a first end 62 and an opposite second end 63. Still further, the male member 60 is defined by an exterior-facing surface 64, and an interior-facing surface 65. As understood by FIG. 2 and subsequent drawings, the male member 60 is operable for substantially telescoping and frictional engaging receipt within the longitudinally extending passageway 23, and more specifically the first portion 30 thereof. This arrangement allows for the shoulder portion 50 to be easily detached and replaced based upon the operational needs, and wear and tear as experienced by the shoulder portion 50.

Figures 3, 4:
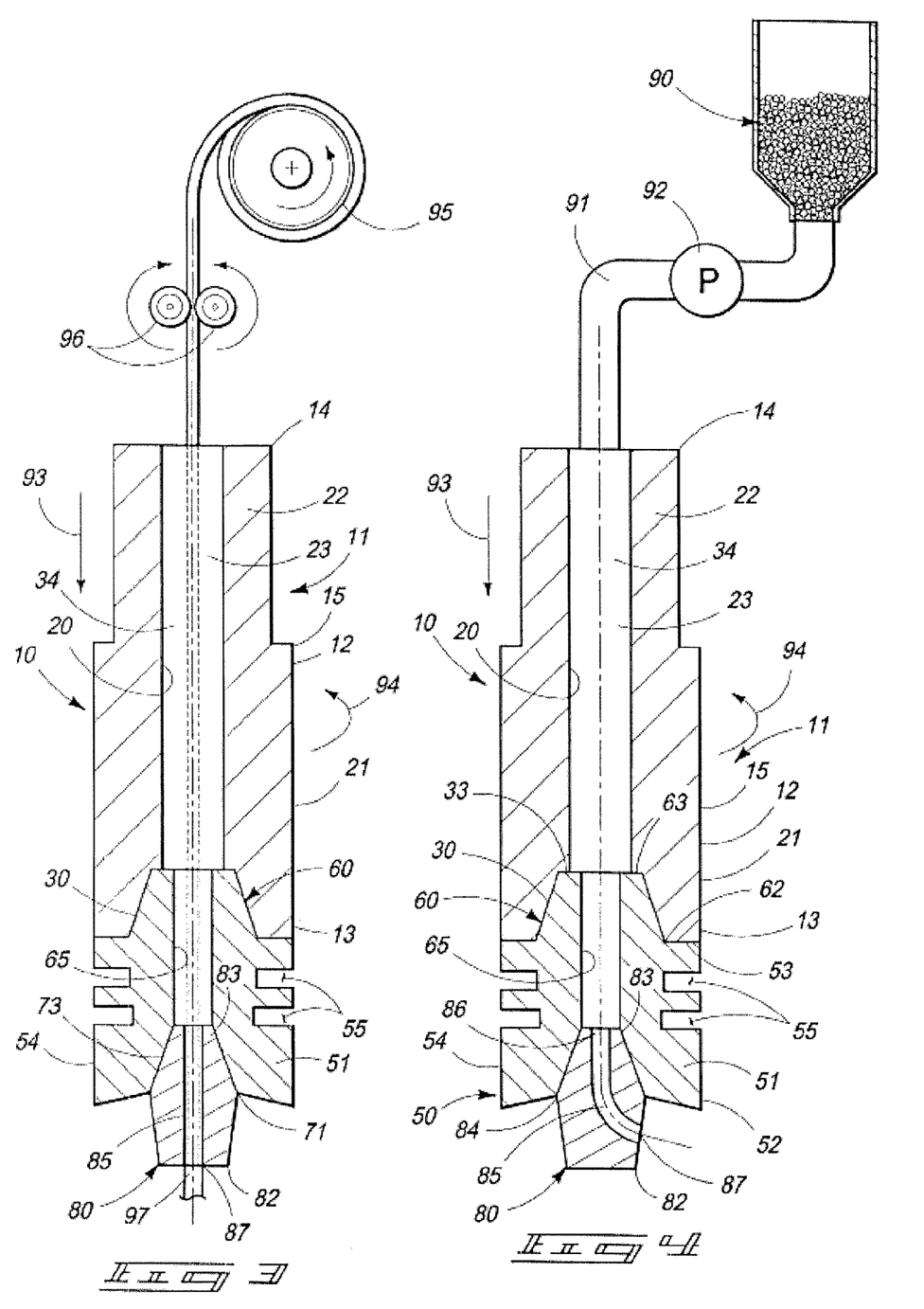
FIG. 3 is a greatly simplified, schematic, longitudinal, sectional view of a first form of the material-forming tool of the present invention.
FIG. 4 is a greatly simplified, schematic, longitudinal, sectional view of a second form of the material-forming tool of the present invention.

As seen in FIGS. 2, 3 and 4, the shoulder portion 50 defines, by means of the interior-facing surface 65, a pin passageway that is generally indicated by the numeral 70. The pin passageway 70 has a first end 71, and an opposite second end 72. Still further, as seen in FIG. 2, for example, the pin passageway 70 is characterized by a first portion 73, and a second portion 74 that communicates with same. As seen in FIG. 2, the pin passageway 70 has a diminishing inside diametral dimension when this is measured in a direction that extends from the first end 71 in the direction of the second end 72 thereof. Still referring to FIGS. 2, 3 and 4, the material-forming tool 10 of the present invention includes a pin 80, which is releasably engageable with the shoulder portion 50, and which is operable to engage a work piece as will be discussed in greater detail hereinafter. The pin 80 includes a main body 81 that has a first end 82 that engages the work piece as will be described, and a second end 83 that is received in the pin passageway 70 as defined by the shoulder portion 50. As illustrated, the pin 80 is telescopingly received, at least in part, in the pin passageway 70, and extends generally longitudinally outwardly relative to the first end 52 of the main body 51. As illustrated, the pin 80 has an intermediate portion 84, and the outside diametral dimension of the main body 81, of the pin 80, diminishes when measured from a position beginning at the intermediate portion 84, and extending longitudinally, outwardly to the opposite first and second ends 82 and 83 thereof. In an alternative embodiment (not shown), the pin 80 may have a substantially constant radius. As illustrated in the drawings, the pin 80 is releasably frictionally engaged by the main body 51 of the shoulder portion 50. The outside diametral dimension of the pin 80 forms a taper that allows a portion of the pin 80 to be telescopingly and frictionally received within the pin passageway 70. In the arrangement as seen in FIGS. 2, 3 and 4, a passageway 85 is formed through the main body 81 of the pin. The passageway 85 has a first end 86 and an opposite second end 87. The passageway 85 is coupled in fluid flowing relation relative to the pin passageway 70, which, in turn, is coupled in fluid flowing relation relative to the longitudinally extending passageway 23. As illustrated in FIG. 2, the distal second end 87 of the passageway 85 may be positioned in spaced relation relative to the first end 82, or as illustrated in FIG. 3, the passageway 85 may extend substantially longitudinally therethrough extending from the first end 82 to the second end 83 thereof. In yet another form of the invention, it should be understood that the passageway may terminate at several locations. The purpose of the passageway 85 will be discussed in greater detail, hereinafter. In the arrangement as shown, the shank portion 11, shoulder portion 50 and pin 80 can be fabricated from the same and/or dissimilar materials and may further have a similar thermal coefficient of expansion. Depending upon the work piece that will be engaged, and which will be discussed hereinafter, the shoulder portion 50, and pin 80 may be fabricated from a metal or metal alloy, which is selected from the group comprising high temperature refractory metals such as tungsten, molybdenum, and their alloys, and further including ceramics such as boron nitride and related compounds, as well as tungsten and their related carbides.

Referring now to FIG. 4, it will be seen that the material-forming tool 10 of the present invention may be coupled in fluid flowing relation relative to a source of particularized material such as a source of particularized metal 90 by means of a conduit, which is generally indicated by the numeral 91. The conduit 91 is coupled in fluid flowing relation relative to the first end 13 of the shank portion 11, and more specifically to the longitudinally extending passageway 23. Acting upon the source of particularized material is a pump 92 of conventional design. The pump 92 constitutes a means for pumping the source of particularized material 90 into the passageway 23 so as to deliver same at the second end 87 of the passageway 85 that is defined by the pin 80. This technique of delivering the particularized material is defined as "rotational loading" of the material hereinafter. This arrangement will be discussed in greater detail hereinafter, particularized metal can pass through the material-forming tool 10 and exit through the pin 80 for the purposes that will be described in the methodology set forth in greater detail below. Still further, and referring still to FIG. 4, it will be understood that the present invention includes a means for imparting axial force, as indicated generally by an arrow labeled 93, and a means for imparting rotational movement as indicated by an arrow labeled 94. Such forces are typically provided by means of a conventional milling machine, which can provide both the axial and rotational force to render the material-forming tool 10 operational. Referring now to FIG. 3, it will be seen that in another form of the invention, a source of a solid/continuous wire 95 formed of a given material can be provided, and which is supplied to the passageway 23 defined by the shank portion 11. As seen in the drawings, a means 96 for driving the continuous wire 95 is provided and a distal end 97 of the continuous wire 95 exits the first end 82 of the pin 80, through the passageway 85, and more specifically the second end 87 thereof. This is another means of rotationally loading the continuous wire 95.

Figure 5:
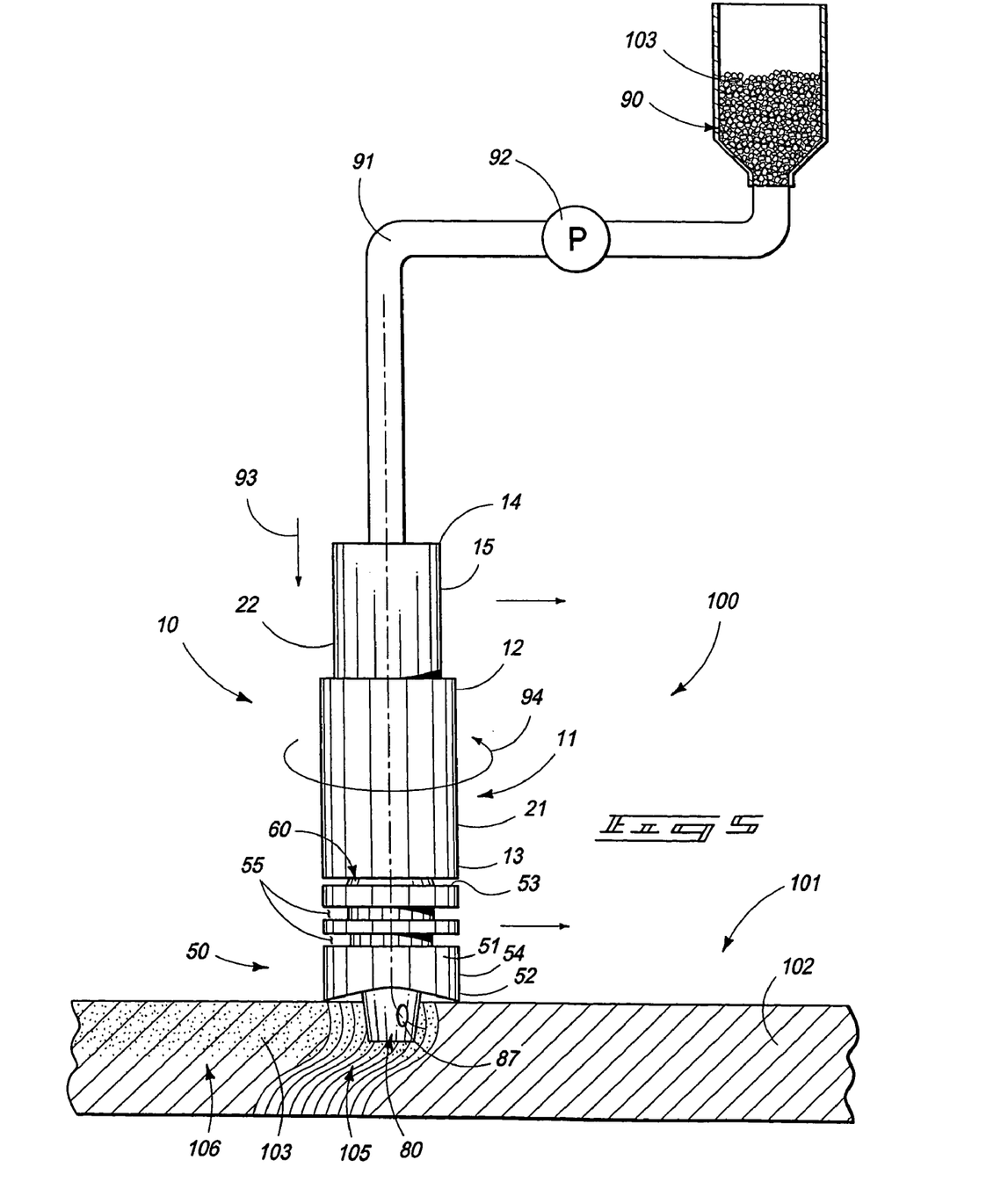
FIG. 5 is a greatly simplified, schematic, side elevation view of the second form of the material-forming tool of the present invention in operation.

Referring now to FIGS. 5-10, respectively, it will be seen that the method of forming a material of the present invention is generally indicated by the numeral 100 and includes the steps as will be discussed below. In the methodology of the present invention 100, a material-forming tool 10 is provided that is operable to engage a work piece, which is generally indicated by numeral 101. As seen by reference to FIGS. 9A, 9B, 9C, FIG. 7, and FIG. 11, the work piece 101 may include a number of different material layers that may be oriented in either a horizontal (FIGS. 9A-9C) or vertical (FIG. 11) orientation. For example, the methodology may include a first step of providing a first material 102, providing a second material 103, and providing a third material 104, respectively, that are disposed in juxtaposed relation one relative to the other. Still further, and referring now to FIG. 9C for example, it will be seen that the methodology 100 could include the steps of providing the work piece 101, which has different portions and which are disposed in predetermined spaced relation one relative to the other, and providing the second material 103, which is positioned therebetween for the purposes as will be described hereinafter. Referring now to FIG. 5, for example, a method for forming material 100 of the present invention is generally shown, and includes the steps of providing a first material 102; providing a second material 103, here illustrated as the source of particularized material 90, which may include metal, ceramic and other similar materials, and placing the second material 103 into contact with the first material. As illustrated, the method for forming material 100 further includes the step of imparting axial force 93, and rotational movement 94 to the material-forming tool 10 thereby locally plastically deforming 105 the first material 102 so as to mix the first material 102 and second material 103 together to form a resulting material 106 having characteristics different from the respective first and second materials 102 and 103. In the illustration as seen in FIG. 5, the step of locally plastically deforming 105 the first material 102 further includes the steps of frictionally heating and rotationally loading the first material. As seen in FIG. 5, the particularized second material 103 exits through the passageway 85, at the second distal end 87, and into the plastically deformed region 105 where it is mixed with the first material 102 as illustrated. As should be understood, in the present methodology, the first and second materials 102 and 103, respectively, may be non-metals. Still further, the first material 102 may comprise a metal, and the resulting material 106 may result in an alloy. Still further, the resulting material 106 may result in a composite. Additionally, it should be understood that the first material 102 may include a metal and the second material 103 may include a non-metal. Additionally, and in the arrangement as shown, the methodology may be useful in combining two different metals. Additionally, the methodology may be useful in combining a first material that includes a non-metal and a second material that comprises a metal. As illustrated most clearly by reference to FIG. 6, in the methodology 100 as described, the first and second materials 102 and 103 are each substantially continuous, and the plastically deformed region 105 is effective for mixing the first and second materials 102 and 103 together to provide the resulting material 106. Again, as seen in FIG. 5, in the methodology as described, at least one of the first or second materials 102 and 103 may be particularized and may be rotationally loaded.

Figure 7:
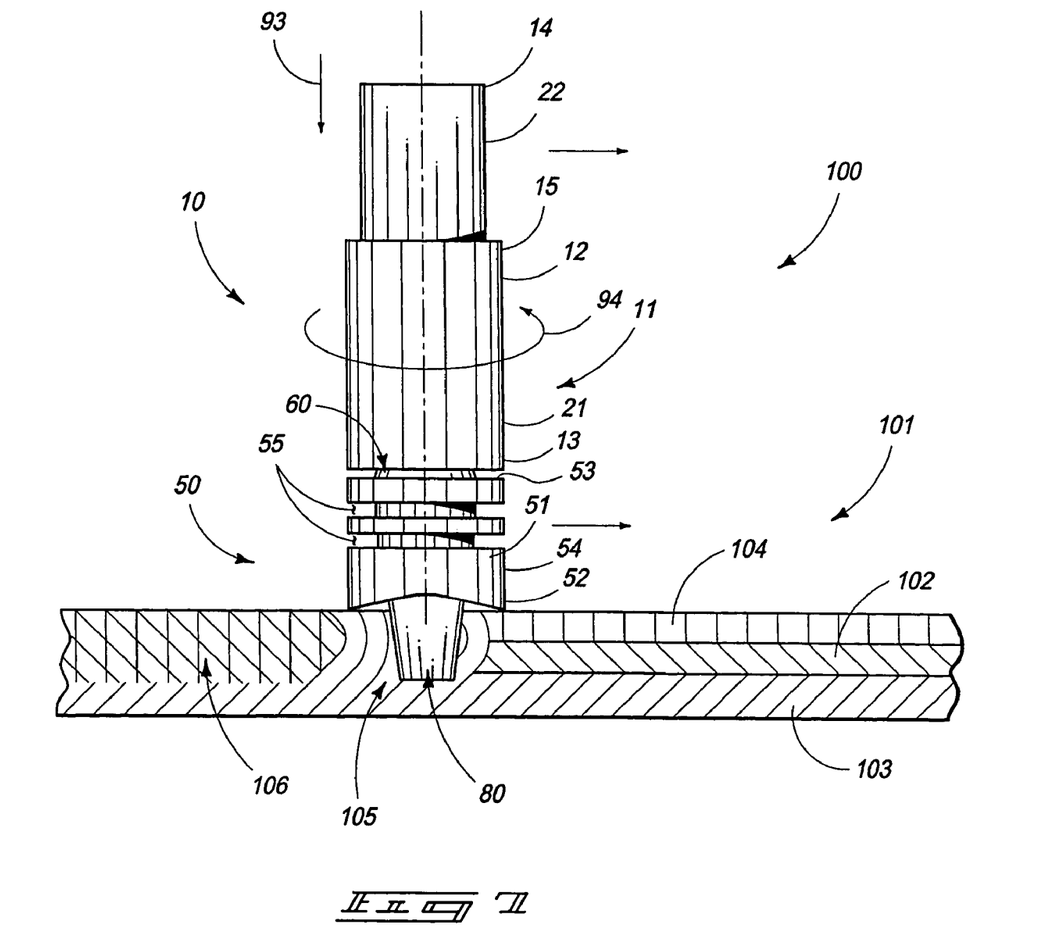
FIG. 7 is a greatly simplified, schematic, side elevation view of one form of the material-forming tool of the present invention in operation.

Referring now to FIG. 7, it will be seen that the methodology 100 includes a step of providing a third material 104, which is placed into contact with the first and second materials 102 and 103. The methodology 100 further includes the step of locally plastically deforming the first, second and third materials 102, 103, and 104, respectively, so as form a resulting material 106. In one of the several forms of the invention as seen, the step of locally plastically deforming the first material 102 comprises the steps of providing a material-forming tool 10, and simultaneously imparting axial force 93, and rotational movement 94 to the tool; contacting the material-forming tool 10 with the first material 102 so as to locally plastically deform 105 the first material 102; and supplying a particularized second material 103 to the first material 102, which has been previously locally plastically deformed by the axial force and rotational movement of the material-forming tool 10.

Figure 8:
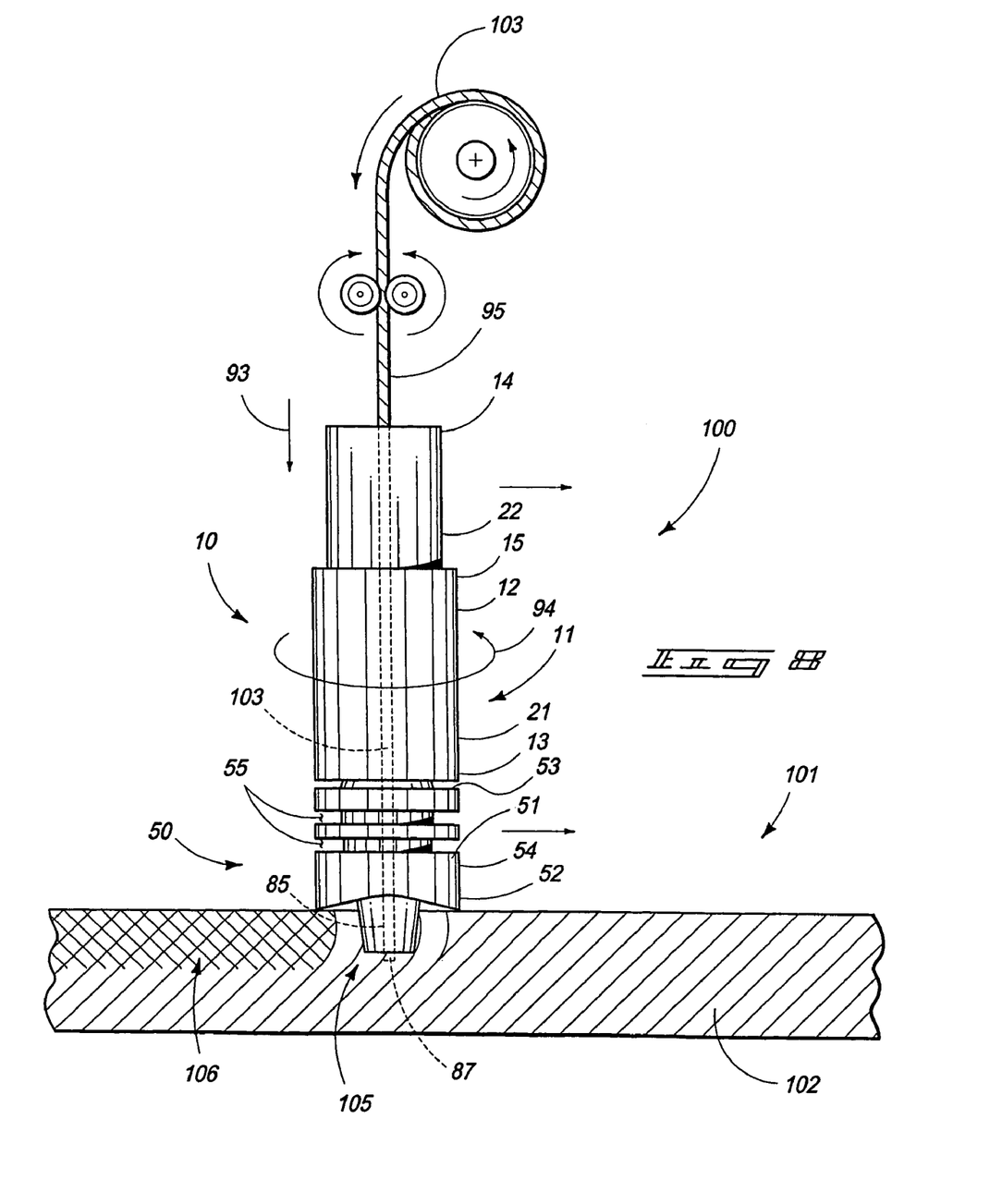
FIG. 8 is a greatly simplified, schematic, side elevation view of the first form of the material-forming tool of the present invention shown in operation.

Referring now to FIG. 8, in the methodology 100 as described above, the second material 103 may further comprise a source of a continuous wire 95, and the methodology 100 includes a step of supplying the substantially continuous wire 95 to the first material 102, which has been previously locally plastically deformed 105 by the simultaneous application of the axial force 93, and rotational movement 94 of the material-forming tool 10. As seen best by FIG. 5, the step of supplying the particularized second material 103 to the first material 102 may further include the steps of providing a passageway 85 in the material-forming tool 10; and delivering the particularized second material 103 to the locally plastically deformed first material 102 by way of the passageway 85. Further, and referring to FIG. 8, the step of supplying the substantially continuous wire 95 to the first material 102 further includes the steps of providing a passageway 85 in the material-forming tool 10; and delivering the substantially continuous wire 95 of the second material 103 to the locally plastically deformed first material 102 by way of the passageway 85.

Figure 6:
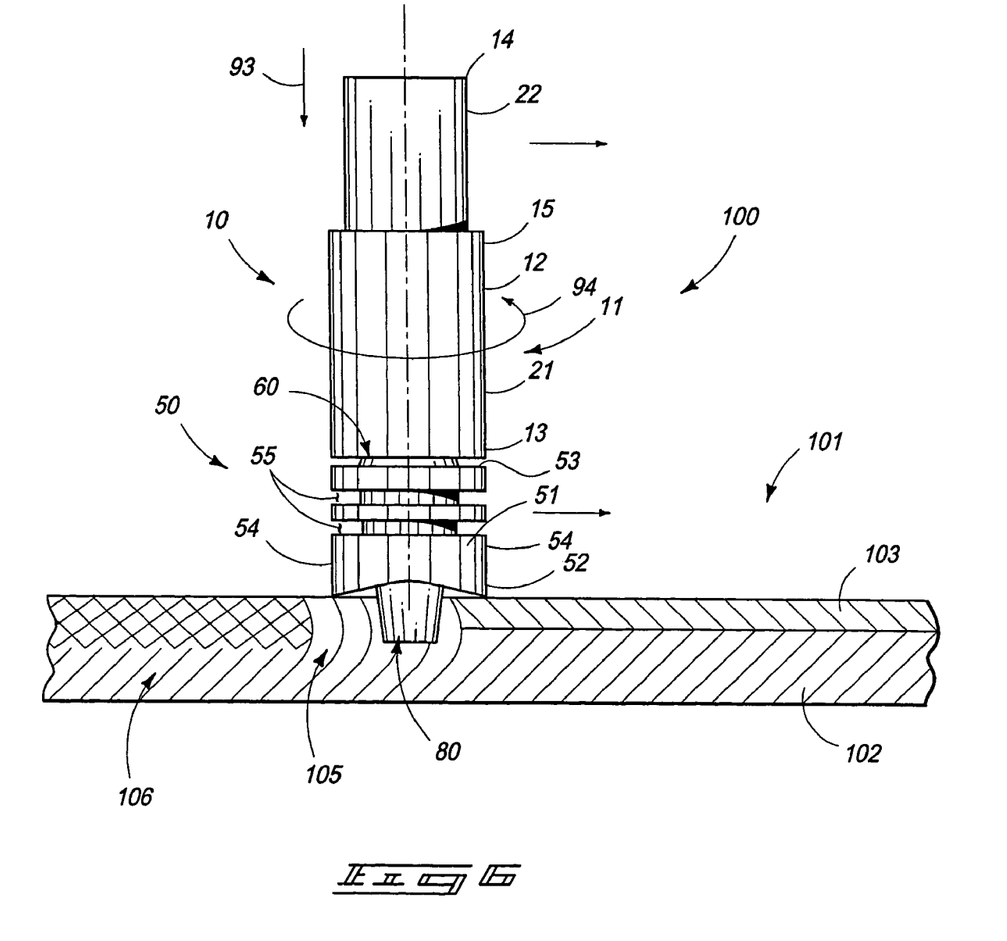
FIG. 6 is greatly simplified, schematic, side elevation view of one form of the material-forming tool in operation.
Figure 9A:
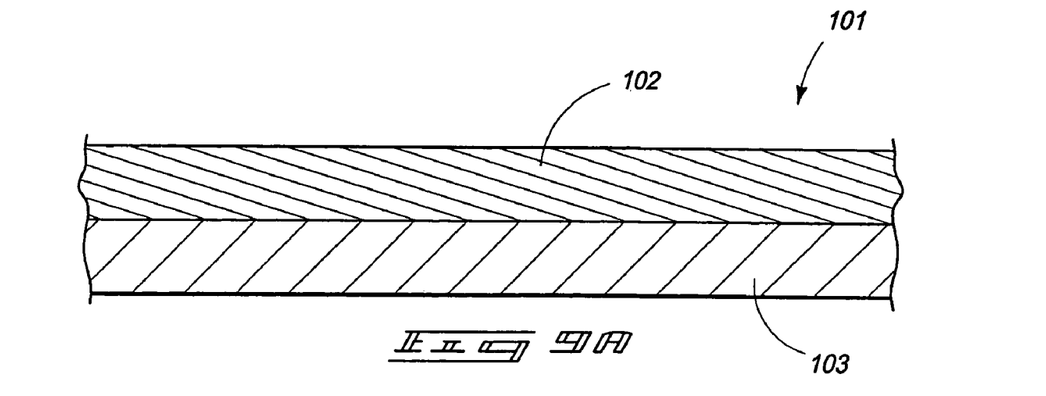
FIGS. 9A, 9B and 9C illustrate combinations of horizontally arranged first, second and third materials that may be acted upon by the material-forming tool of the present invention.
Figure 9B:
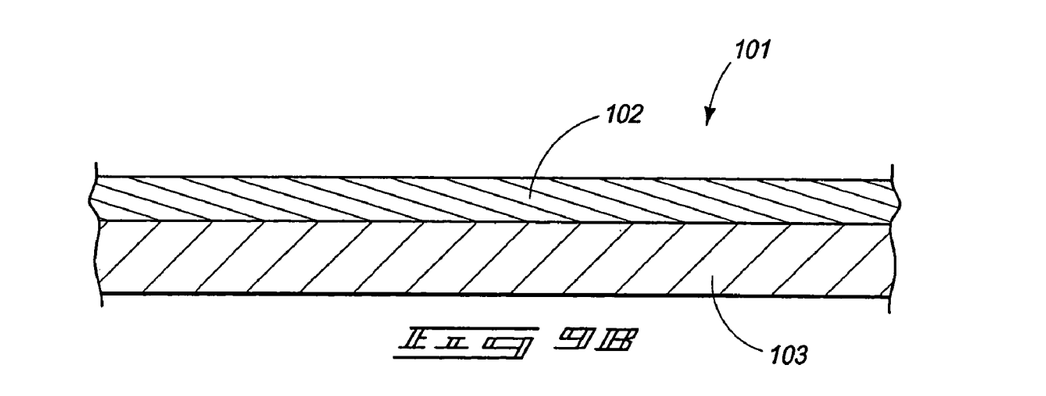
Figure 9C:
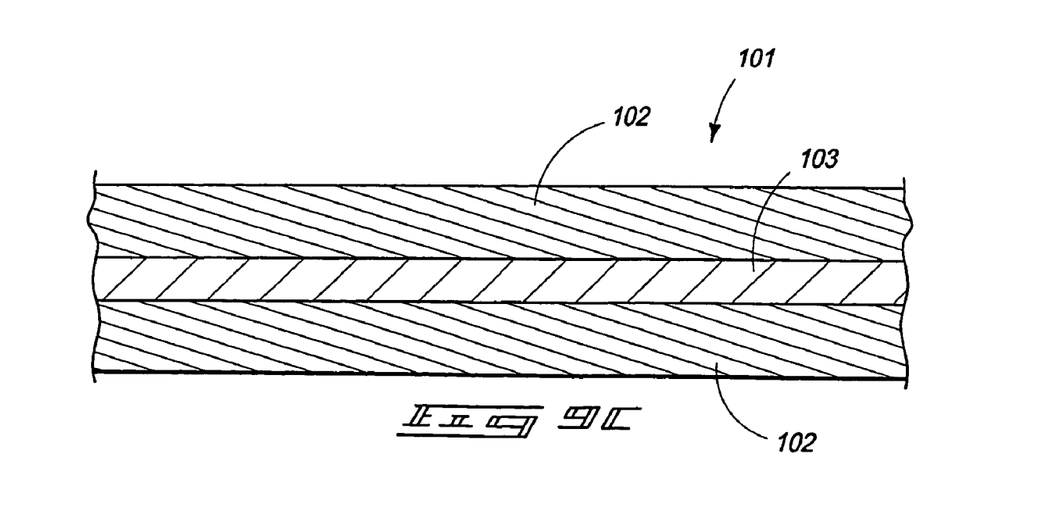

Referring now to FIGS. 5-8, the method for forming a material 100 of the present invention includes the steps of providing a first material 102, which may comprise a metal; providing a second material 103, which may comprise a metal, and positioning the second metal in juxtaposed relation relative to the first metal; providing a material-forming tool 10 and imparting axial force 93, and rotational movement 94 to the material-forming tool 10; and contacting the tool with the first and second metals 102 and 103 and imparting sufficient axial force 93 and rotational movement 94 to the material-forming tool 10 so as to locally plastically deform 105 and mix the first and second metals, and form a resulting material 106 having physical characteristics different from the respective first and second materials 102 and 103, respectively. As seen in FIG. 6, the first and second materials 102 and 103 are substantially continuous surfaces that are juxtaposed, one relative to the other. Referring now to FIGS. 9A and 9B, respectively, it will be seen that the first and second materials 102 and 103 have a combined thickness dimension, wherein the resulting material 106, which is formed from same, has a thickness dimension that is substantially equal to the combined thickness dimension of the first and second metals. Still further and based upon the materials used, the resulting material 106 may have a thickness dimension that is less than the combined thickness dimension of the first and second metals. Referring now to FIG. 9A, it will be seen that the first and second metals or first and second materials 102 and 103 may each have substantially the same thickness dimension. Further, referring now to FIG. 9B, it will be seen that the first and second materials or metals 102 and 103 may each have a different thickness dimension. Still further, referring now to FIG. 9C, in the methodology as described, the step of providing the first and second materials or metals 102 and 103 may further include the steps of providing at least two layers of one of the first or second metals, and locating the two layers in spaced relation one relative to the other; and positioning the remaining metal layer therebetween the two layers of the first and/or second material or metal 102 and 103, respectively. In the arrangement as seen in FIG. 9C, for example, the at least two layers of the first or second material or metal 102 or 103 may each have substantially the same thickness, or in the alternative have different thickness dimensions.

Figure 10:
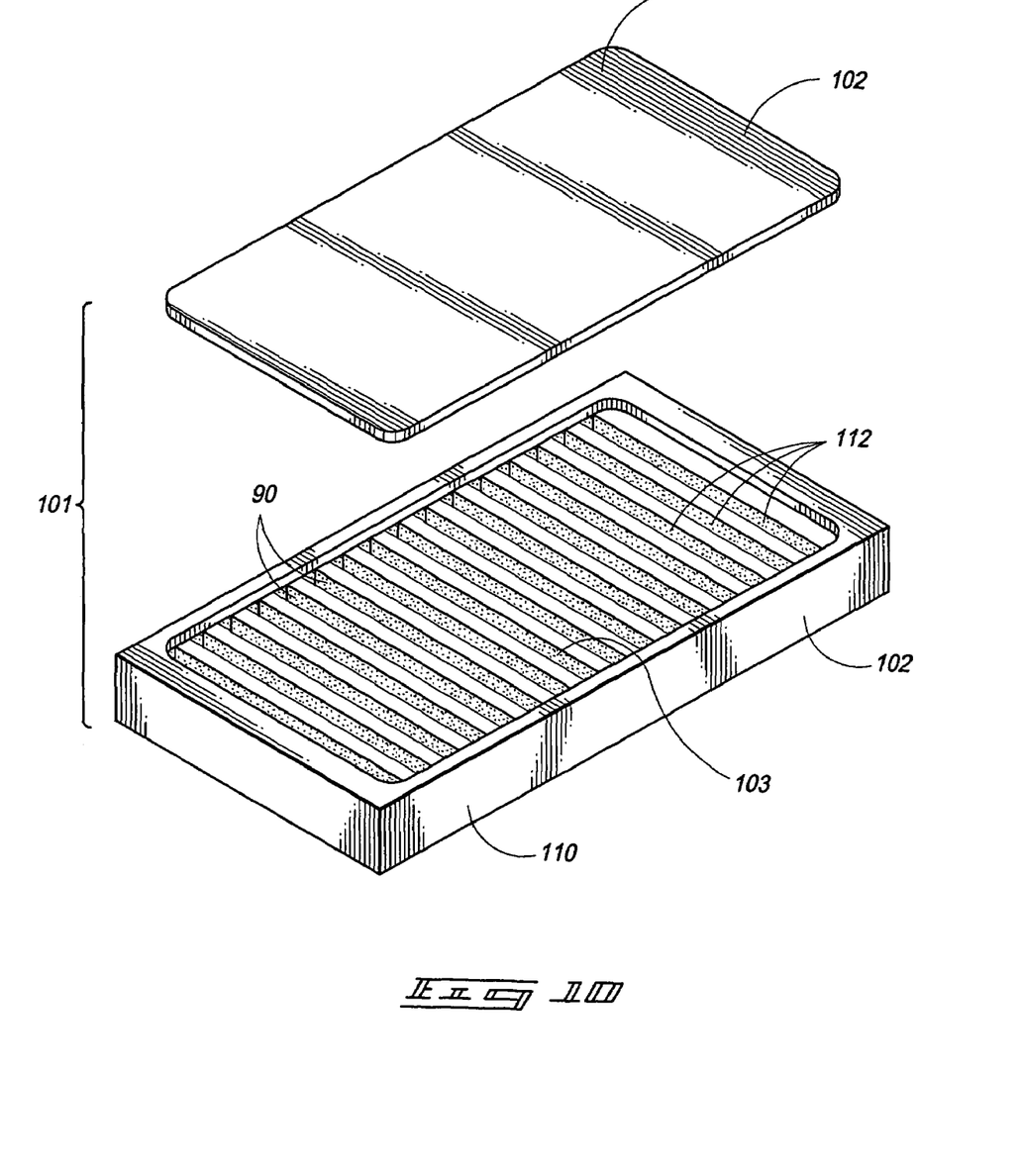
FIG. 10 is a greatly simplified, perspective exploded view of a composite material that may be acted upon by the material-forming tool of the present invention.

Referring now to FIG. 10, the work piece 101, includes a first continuous layer 110 having given dimensions, and further, a second continuous layer 111 is appropriately sized, and then placed in covering relation over a plurality of cavities 112 that are formed in a predetermined pattern in the first continuous layer 110. As should be understood, the second continuous layer 111 may be formed from the same material as the first continuous layer 110, or may further be formed from a different material. As illustrated in the exploded view of FIG. 10, a second material such as the particularized material 90 is delivered into the respective cavities 112. Thereafter, the second continuous layer 111 is placed in covering relation relative thereto and the work piece 101 as seen in FIG. 10 is acted upon by the material-forming tool 10 in the manner as seen in the earlier drawings. Therefore, in the methodology 100 as described, one of the first or second materials 102 or 103 is a substantially continuous layer of metal that defines, at least in part, a cavity 112, wherein the remaining material 103 is particularized and deposited within the cavity.

Figure 11:
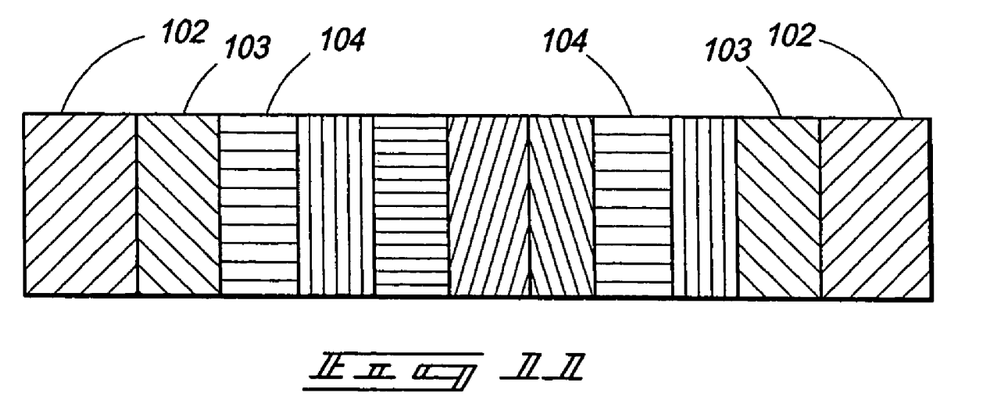
FIG. 11 is a greatly simplified, graphical depiction of a plurality of discrete, vertically oriented materials that may be acted upon by the material-forming tool of the present invention.

Referring now to FIG. 11, an alternative arrangement of a plurality of materials including the first, second and third materials 102, 103 and 104 are shown in a vertical arrangement that can be engaged by the material-forming tool 10 of the present invention.

In the methodology as described, the step of contacting the tool 10 with the first and second materials 102 and 103, which may comprise various metals, further comprises maintaining the rotating tool in contact with the first and second materials 102 and 103 for a time period that is effective to produce a resulting material 106 that is substantially uniform. Further, and referring now to FIG. 5, the step of contacting the tool 10 with the first and second materials or metals 102 or 103 further comprises maintaining the rotating tool in contact with the first and second materials or metals 102 and 103 for a time period that is effective to produce a resulting material 106 that is not uniform throughout. In the arrangement as seen, the first and second materials or metals 102 and 103 are selected from the group that comprises metals, metal alloys, metal ceramics and metal composites.

OPERATION

The operation of the described embodiment of the present invention is believed to be readily apparent and is briefly summarized at this point.

Referring now to FIGS. 3 and 4, a material-forming tool 10 of the present invention is shown that includes a shank portion 11, a shoulder portion 50 that releasably engages the shank portion 11, a pin 80 that releasably engages the shoulder portion 50, wherein the pin 80 defines a passageway 85, and a source of a material 90 or 95 coupled in material flowing relation relative to the pin 80. In the arrangement as shown, the material-forming tool 10, and more specifically the pin 80 thereof, has a first, proximal end 82, and an opposite, distal, second end 83, wherein the passageway 85 extends from the first end 82 in the direction of the second end 83. As seen in FIGS. 3 and 4, the source of the material 90 is received in the passageway 85 at the one end, and is discharged from the pin at a location that is adjacent to the opposite end. As illustrated in FIGS. 1 and 2, the shoulder portion 50 is coupled in material flowing relation relative to the pin 80, and the source of the material 90, for example, is supplied to, and flows through, the shoulder portion 50, and into the passageway 85 that is defined by the pin 80. As illustrated in FIGS. 1 and 2, the passageway 85 terminates at a single location, i.e., second end 87, that is adjacent to one end of the pin 80. However, it should be recognized that the passageway 85 may terminate at a plurality of locations that are adjacent to the end of the pin 80. This arrangement would be helpful in manufacturing an alloy, or composite, for example, which has a gradation in its overall structure. As seen in the various drawings, the passageway 85 is operable to receive a source of particularized material, or further a solid and continuous wire as shown in the drawings (FIG. 3).

The method for forming a material 100, of the present invention, includes the steps of providing a first material 102;

providing a second material 103, and placing the second material 103 into contact with the first material; and locally plastically deforming 105 the first material 102 so as mix the first material 102 and second material 103 together so as to form a resulting material 106 having characteristics different from the respective first and second materials 102 and 103. As herein discussed, the method for forming a material 100 of the present invention also includes the steps of providing a first material or metal 102; providing a second material or metal 103, and positioning the second metal or material in juxtaposed relation relative to the first metal or first material 102; providing a material-forming tool 10 and imparting axial force 93, and rotational movement 94 to the material-forming tool 10; and contacting the tool with the first and second metals or materials 102 and 103 and imparting sufficient axial force 93 and rotational movement 94 to the material-forming tool 10 so as to locally plastically deform 105 and mix the first and second metals and/or materials 102 and 103 together to form a resulting material 106 having physical characteristics different from the respective first and second metals or materials 102 and 103, respectively.

Therefore, it will be seen that the material-forming tool 10 and method for forming a material 100 of the present invention provides many advantages over other tools and techniques that have been developed heretofore and that have been useful in the formation of various materials. As presently disclosed, the present material-forming tool 10 can be quickly disassembled, repaired, and replaced in a fashion not possible heretofore with respect to other similar tools.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method for forming a material, comprising:
providing a substantially continuous layer which defines, at least in part, a plurality of cavities, the substantially continuous layer comprising a first metal;
providing a second metal, and positioning the second metal in juxtaposed relation relative to the first metal;
depositing a particularized metal within each of the plurality of cavities; and
contacting the first and second metals with a tool while imparting sufficient axial force and rotational movement to the tool so as to locally plastically deform and mix the first and second metals and the particularized metal to form a resulting material having physical characteristics different from the respective first and second metals.

2. A method for forming a material, comprising:
providing a substantially continuous layer which defines, at least in part, a plurality of cavities, the substantially continuous layer comprising a first metal;
depositing a particularized metal within each of the plurality of cavities; and
contacting the first metal with a tool while imparting sufficient axial force and rotational movement to the tool so as to locally plastically deform and mix the first metal and the particularized metal to form a resulting material having physical characteristics different from the respective first metal and particularized metal.

* * * * *

UNITED STATES PATENT AND TRADEMARK OFFICE
CERTIFICATE OF CORRECTION

PATENT NO. : 7,597,236 B2
APPLICATION NO. : 11/205616
DATED : October 6, 2009
INVENTOR(S) : Tolle et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 995 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,597,236 B2  
APPLICATION NO. : 11/205616  
DATED : October 6, 2009  
INVENTOR(S) : Charles R. Tolle et al.

Page 1 of 1

It is certified that error appears in the above-identified patent and that said Letters Patent is hereby corrected as shown below:

In the specification

| | | |
|---|---|---|
| COLUMN 6, | LINE 56, | change "the tool;" to --the material-forming tool 10;-- |
| COLUMN 6, | LINE 61, | change "force and rotational movement of" to --force 93 and rotational movement 94 of-- |
| COLUMN 7, | LINE 23, | change "the tool with" to --the material-forming tool 10 with-- |
| COLUMN 7, | LINE 24, | change "second metals" to --second materials or metals-- |
| COLUMN 8, | LINE 9, | change "remaining material" to --remaining second material-- |
| COLUMN 8, | LINE 10, | change "the cavity." to --the cavity 112.-- |
| COLUMN 8, | LINES 17, | change "tool 10" to --material-forming tool 10-- |
| COLUMN 8, | LINE 19, | change "rotating tool in" to --rotating material-forming tool 10 in-- |
| COLUMN 8, | LINE 22, | change " the tool 10" to --the material-forming tool 10-- |
| COLUMN 8, | LINE 49, | change "the pin" to --the pin 80-- |
| COLUMN 8, | LINE 66, | change "method for forming a material 100, of" to --method 100 for forming a material of-- |
| COLUMN 9, | LINE 7, | change "method for forming a material 100 of" to --method 100 for forming a material of-- |
| COLUMN 9, | LINE 10, | change "material in" to --material 103 in-- |
| COLUMN 9, | LINE 14, | change "the tool with" to --the material-forming tool 10 with-- |
| COLUMN 9, | LINE 23, | change "method for forming a material 100 of" to --method 100 for forming a material of-- |

Signed and Sealed this  
Tenth Day of April, 2012

David J. Kappos  
*Director of the United States Patent and Trademark Office*